April 2, 1940.  W. E. FREEMAN ET AL  2,195,774
GREASE SEAL
Filed Aug. 14, 1939  3 Sheets-Sheet 2

W. E. Freeman
C. C. Henderson
INVENTORS.
BY
ATTORNEYS.

April 2, 1940.  W. E. FREEMAN ET AL  2,195,774
GREASE SEAL
Filed Aug. 14, 1939  3 Sheets-Sheet 3

W. E. Freeman
C. C. Henderson
INVENTORS.

BY C.A.Snow&Co.
ATTORNEYS.

Patented Apr. 2, 1940

2,195,774

UNITED STATES PATENT OFFICE 2,195,774

GREASE SEAL

Wayne E. Freeman and Charles C. Henderson, Spring Valley, Minn.

Application August 14, 1939, Serial No. 290,082

1 Claim. (Cl. 286—11)

This invention relates to a seal designed primarily for use in connection with a shaft and parts associated therewith.

Heretofore difficulty has been experienced in controlling grease, oil, gas or air at points where a shaft, hub, or the like has been positioned for movement relative to a case or other structure, and in some mechanisms, such for example as tractors, further difficulties have been experienced due to the fact that dirt and other foreign substances work into the bearings and cause rapid deterioration.

An object of the present invention is to provide a seal which can be applied readily and which not only retains the grease but also acts to deflect foreign substances away from the seal.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the invention has been shown applied to only one type of mechanism such as found, for example, in a tractor.

In said drawings

Figure 1:
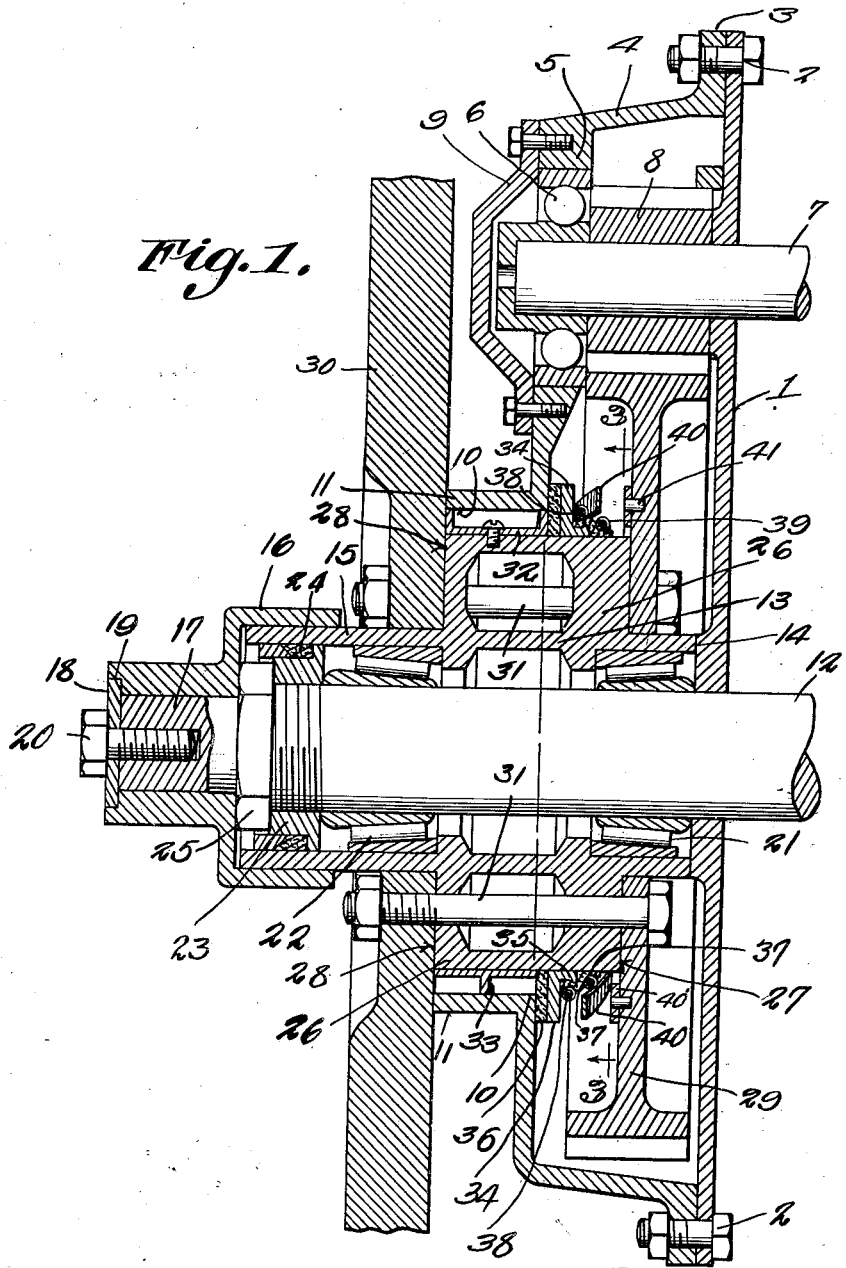
Figure 1 is a central vertical section through the structure constituting the present invention, the axle and side shaft being shown in elevation.

Referring to the figures by characters of reference, 1 designates the inner side of a housing which is stationary and bolts 2 or the like are employed for fastening thereto the marginal flange 3 of the outer housing member 4. This member 4 is provided with an opening 5 near its periphery for the reception of an anti-friction bearing 6 which serves to center and is engaged by the end of a drive shaft 7 rotatably mounted in the plate 1. A top 8 is detachably mounted on the housing member 4 and bridges the opening 5 so as to protect the bearing 6 from the admission of foreign substances.

An opening 10 is located in the housing member 4 at a point removed from the opening 5 and is surrounded by an outwardly projecting cylindrical extension 11.

An axle 12 is extended through plate 1 and is located within and concentric with the opening 10 and extension 11. A hub 13 extends around the axle and bears at one end against plate 1, as shown at 14 while its other end has a tubular extension 15 projecting into a cap 16 so as to rotate therein. This cap is fitted snugly on a stud 17 projecting from the axle and is held assembled with the stud by a disk 18 seated in the end of the cap as shown at 19 and held in place by a screw 20 which is engaged in the stud.

An anti-friction bearing 21 is located between axle 12 and that end portion of the hub nearest the plate 1. Another anti-friction bearing 22 is located between the axle 12 and the tubular extension 15 of the hub. A thrust ring 23 is mounted on the axle within the tubular extension 15 outwardly from bearing 22 and is suitably packed, as indicated at 24, there being a nut 25 engaging the axle and within the extension 15 for engaging ring 23.

Hub 13 is enlarged between its ends as shown at 26 so as to provide spaced parallel faces 27 and 28. Against one of these faces is seated a driven gear 29 which extends around the adjacent portion of the hub 13. The opposed face 28 of the hub is fitted tightly against the wheel 30 a portion of which has been shown in Figure 1 and which wheel is fitted about the tubular extension 15. Bolts 31 are extended through wheel 30, hub 13 and gear 29, for the purpose of binding them together securely as shown so that these three parts will rotate as one unit. Gear 29 is in constant mesh with driving gear 8 so that when the shaft 7 is actuated, motion will be transmitted therefrom to gear 29 and hub 13 as well as the traction wheel 30.

The peripheral surface of hub 13 between the faces 27 and 28 is spaced from the extension 11 but has a ring 32 fitted snugly thereon and secured thereto. This ring, which is a part of the present invention, is formed on its outer surface with a spiral scraping blade 33 having wiping contact with the inner surface of the extension 11 and so pitched that when the hub is rotating in one direction, the spiral blade will scrape along the inner surface of extension 11 and serve to push toward wheel 30 any foreign substances that might in some way work into the space surrounded by the extension 11.

A sealing ring 34 is extended around the enlarged portion 26 of the hub between gear 29 and that portion of housing member 4 immediately surrounding the opening 10. In the structure shown in Figures 1 and 4, this ring has an annular flange 35 which bears upon the hub.

A packing ring 36 is interposed between ring 34 and the adjacent surface of the housing member 4. Flange 35 is surrounded by one end portion of a short flexible tube 37 of packing material and this end portion is held firmly gripped about the flange 35 by a continuous coiled spring 38. The other end portion of the flexible packing tube 37 is extended around the hub 13 and is held tightly thereagainst by a continuous coiled spring 39.

For the purpose of holding ring 34 and packing ring 36 properly pressed toward the adjacent surface of the housing member 4, a series of leaf springs 40 is provided. Each of these leaf springs is anchored at one end to one side of a ring 40' held by pins 41 while the other end of each leaf spring is secured to the ring 34 so as to exert a constant thrust thereagainst. Several of these leaf springs are employed as will be noted by referring particularly to Figure 2.

The flexible sealing ring 37 can be made of leather or any other suitable material and constitutes an efficient means for preventing leakage of grease from the housing between ring 34 and hub 13. The packing ring 36 serves as an efficient seal to prevent leakage between ring 34 and the housing member 4.

Figure 2:
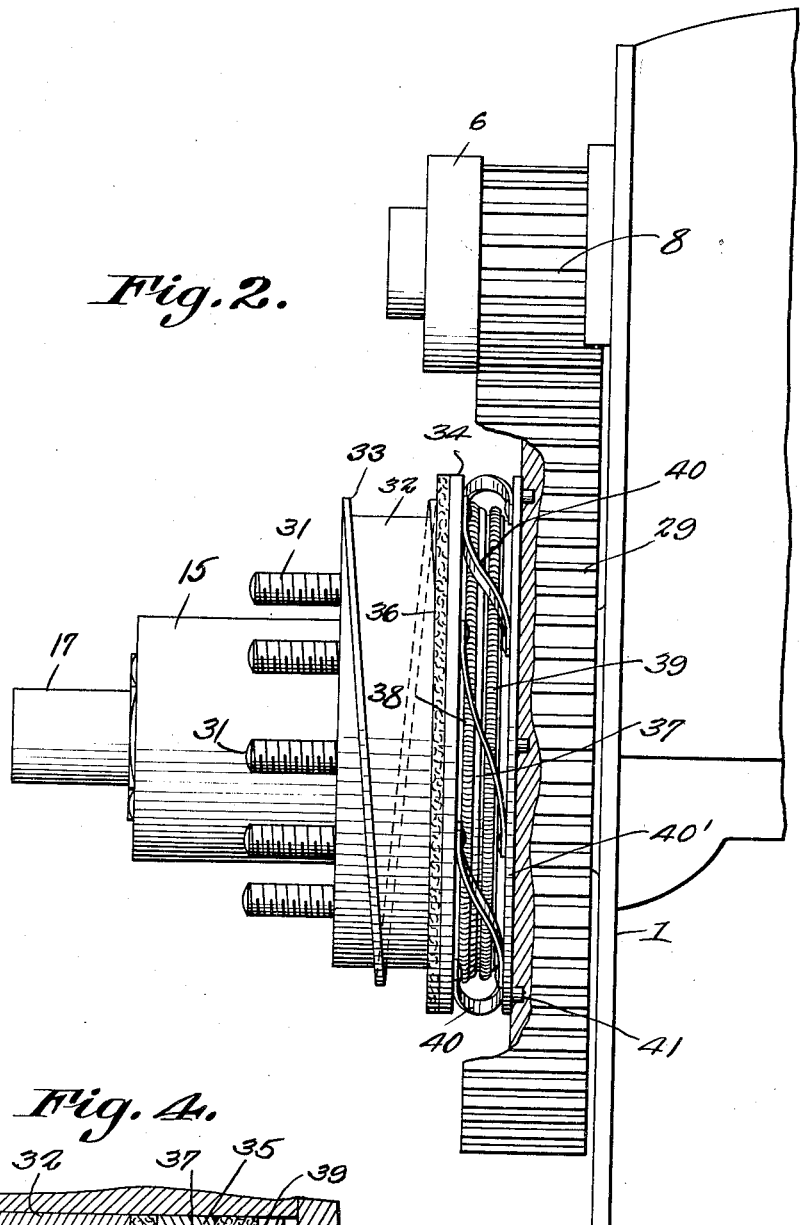
Figure 2 is a front elevation showing the position of the seal, a portion of the structure being removed and one of the gears broken away.

Obviously by removing the screw 20, detaching wheel 30 from bolts 31, and removing the housing member 4, the parts of the seal as well as the gears will be fully exposed as will be noted by referring to Figure 2.

Figure 4:
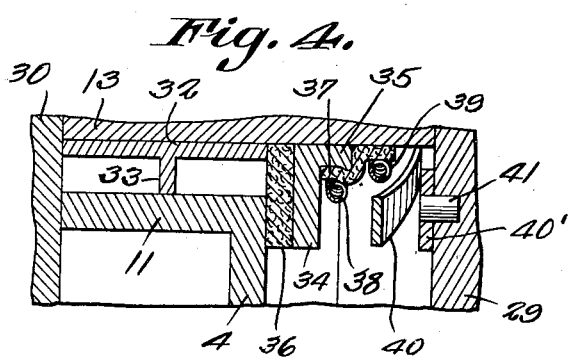
Figure 4 is an enlarged transverse section through a portion of the seal.
Figure 3:
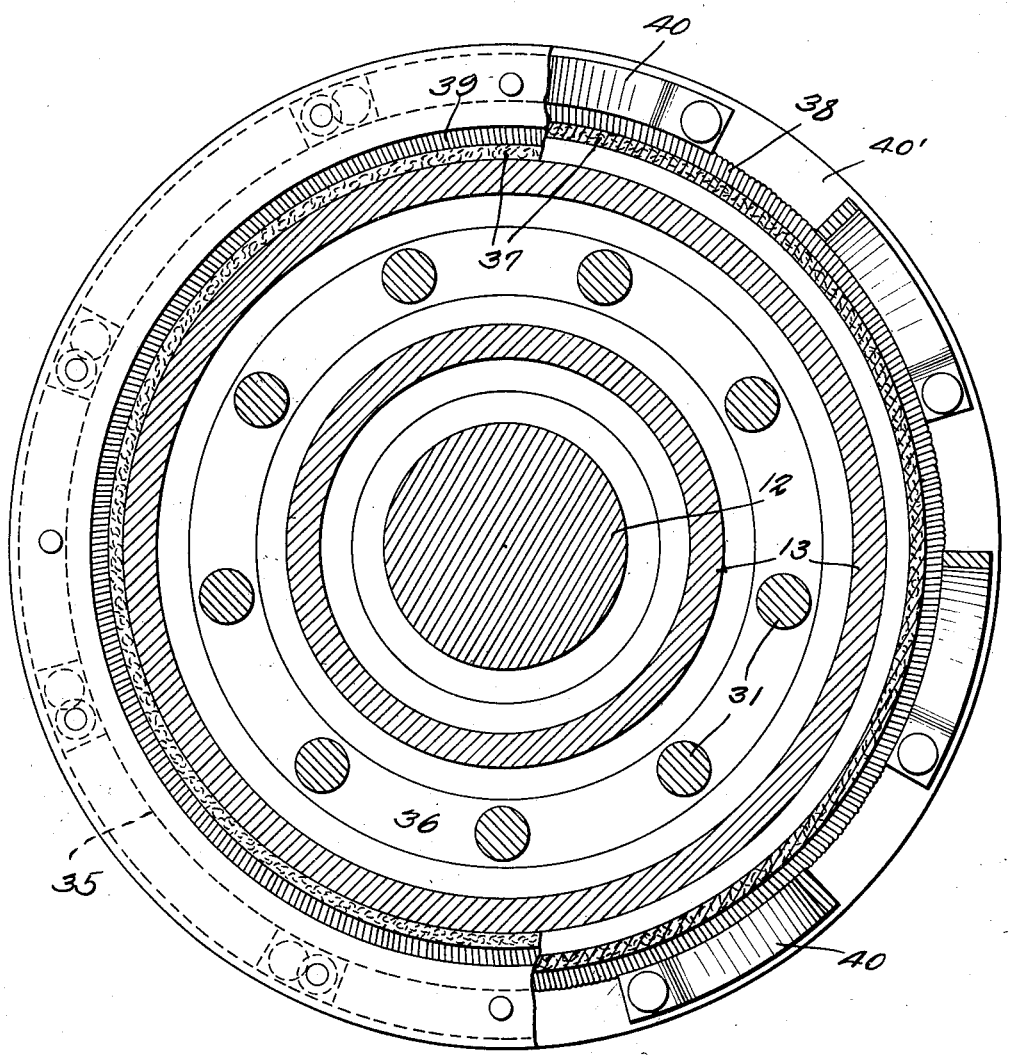
Figure 3 is an enlarged section on line 3—3, Figure 1.
Figure 5:
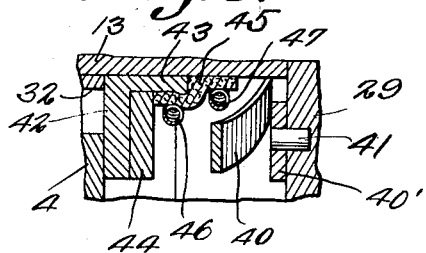
Figure 5 is a similar view showing a slightly modified construction.

Instead of using a packing ring such as illustrated at 36 in Figure 4, a metal or plastic ring 42 can be employed as in Figure 5, this ring having an annular flange 43 which, in turn, is surrounded by a ring 44. A short tube of flexible packing material, indicated at 45, is gripped about flange 43 by a spring 46 and another spring 47 serves to grip the other end portion of the packing tube about the hub 13.

What is claimed is:

The combination with a member having an opening and a hub extending into the opening, of a flanged ring extending around the hub, separate yielding means bearing against the ring for urging the ring normally toward that portion of the member into which the hub extends, a flexible packing tube having its ends surrounding and fitted snugly upon the ring flange and the hub respectively, and continuous springs extending around said ends of the packing tube and clamping them upon the flange and the hub respectively.

WAYNE E. FREEMAN.
CHARLES C. HENDERSON.